United States Patent Office 3,555,390
Patented Jan. 12, 1971

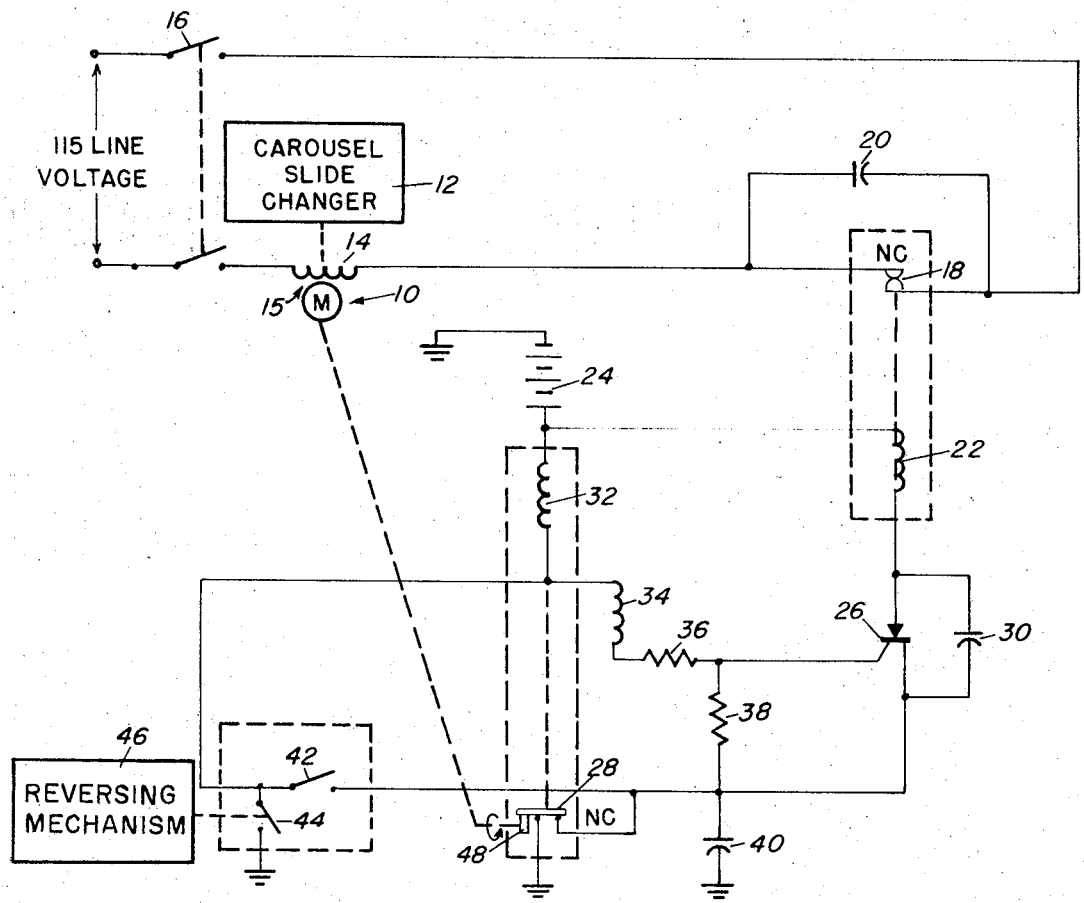

3,555,390
SWITCHING CIRCUIT FOR MOTOR CONTROL IN SLIDE SCANNING SYSTEMS
Robert J. Peffer and George C. Waybright, Batavia, N.Y., assignors to Sylvania Electric Products Inc., a corporation of Delaware
Filed Oct. 7, 1968, Ser. No. 765,517
Int. Cl. G05d 3/00
U.S. Cl. 318—466
7 Claims

ABSTRACT OF THE DISCLOSURE

A motor drive for a slide changing mechanism in a slide projector is provided in which the motor is idle except when actually required to effect a change in slides.

BACKGROUND OF THE INVENTION

In many uses of a motor it is found that the running of the motor causes electrical disturbances which are prejudicial to the proper functioning of other apparatus adjacent to the motor. For example, in a system for operating a slide change mechanism in a projector wherein the slide is scanned by a cathode ray tube and the resulting signal transmitted to a television receiver in the same cabinet, as described more fully in the application of Charles B. Neal, William D. Schuster and Benton B. Scott, filed Aug. 1, 1967, Ser. No. 657,623 for "Color Reproduction System," stray radiations from the motor cause disturbances to arise in the system and visible indications thereof on the TV picture tube screen.

While the selective energization of the motor is of particular use in the relationship above described, it is conceivable that such motor control could be useful in other relations wherein it is undesirable to run the motor either because of vibratory movement of the motor or because of electrical disturbances set up by the running of the motor during certain phases of a cycle of operations.

OBJECTS AND SUMMARY OF THE INVENTION

Accordingly, it is an object of the present invention to provide a motor control circuit operative to selectively energize a motor to accomplish a positive changing function.

A particular object of the invention is to provide a motor control circuit for a slide changing mechanism wherein the motor is operative only during the slide changing function.

According to one aspect of the invention a drive motor is connected in series with a first switching means which when energized operates to deactivate the motor. A second switching means when energized operates to de-energize the first switching means to thereby activate the motor to accomplish the change function.

BRIEF DESCRIPTION OF THE DRAWING

The accompanying drawing is a schematic circuit diagram of a motor control circuit according to the present invention.

DESCRIPTION OF THE PREFERRED EMBODIMENT

For a better understanding of the present invention, together with other and further objects, advantages, and capabilities thereof, reference is made to the following disclosure and appended claims in connection with the above described drawing.

At 10 is indicated a motor which drives a piece of apparatus, in this case the carousel of a slide changing apparatus 12, a product of the Eastman Kodak Company and known to the trade as the "Kodak Carousel." The carousel carries the slides to be exhibited by the slide changing mechanism associated therewith. The carousel is a turret containing vertical partitions into which slides are stored and from which slides are transported serially to a position to be scanned as by a flying spot scanning tube, after which they are returned to the turret. The turret or carousel by a suitable mechanism may be rotated step by step by the motor and provision is made for reversing the direction of rotation of the turret by engaging a reversing mechanism between the motor and the turret.

In accordance with this invention, the field winding 14 of the motor 15 which may be an A.C. motor is in series with the source of supply, for example, a 115 volt, 60 Hz. house supply power line, via a manually controlled switch 16 and with normally closed relay contacts 18, the contacts being bridged by a spark reducing capacitor 20. The winding or coil 22 associated with the relay contacts is in a series circuit including a direct current supply source 24, as a 20 volt D.C. source, the anode of a silicon controlled rectifier 26, hereinafter referred to as an SCR, the cathode of the SCR and normally closed relay contacts 28. A capacitor 30 bridges the SCR to prevent stray or transient currents from injuring the SCR.

To control the gate of the SCR, the following circuitry is employed: winding or coil 32 of relay contacts 28 is operative to open the relay contacts 28 when the coil is sufficiently energized. A weak energization of the coil will be ineffective to separate the contacts. The electromagnetic coil is connected to one pole of current supply 24, as is one end of relay coil 22. The current supply 24 may be either an alternating current or direct current supply depending on the type of relay used. The opposite end of coil 32 is connected via an inductance 34 and resistance 36 to the gate of the SCR. Also connected to the gate of the SCR is a resistance 38 leading to the ungrounded side of the contacts 28; bridging the contacts 28 is a spark reducing capacitor 40.

The inductance coil 34 and resistors 36 and 38 are employed mainly to protect the SCR from being damaged due to transients incurred when various switches or relay contacts are operated.

Associated with the circuit just described are two switches 42 and 44, the closure of switch 42 serving to drive the carousel forward and the closure of switch 44 serving to drive the carousel backward.

Switch 44 activates a reverse mechanism 46 so that when the switch is closed, the drive mechanism is held in a reversing mode of operation. The switch 42 shorts the resistance elements appended to winding 32 via contacts 28, while closure of switch 44 connects the same coil to ground directly.

The functioning of the apparatus is as follows:

With the main switch 16 closed and before the slide change cycle is initiated, contacts 28 are closed providing a path for current through electromagnetic coil 32, inductance coil 34, resistors 36 and 38 and relay contacts 28 to ground. The potential at the gate of the SCR 26 is now such that the SCR is turned on and current flows from the D.C. source through electromagnetic coil 22 and via the SCR and contacts 28 back to the D.C. source, energizing the relay coil 22 to open and maintain open and normally closed relay contacts 18. While D.C. current does flow through electromagnetic coil 32 via inductance 34, resistances 36 and 38 and contacts 28, it is insufficient to separate the contacts 28. Therefore, relay coil 22 remains energized, the contacts 18 are open and the motor 15 is quiescent. This is the time that the slide is in scanning position and is being viewed on the associated TV picture tube screen without interference by reason of motor operation.

When the forward switch 42 is closed momentarily, as when one wishes to change a slide, the coil 32 of the relay contacts 28 is fully energized, directly across its power supply, thus effecting momentary opening of the contacts 28. With this switch open, there is no path to ground for the cathode current of the SCR and it turns off, thereby de-energizing relay winding 22 and allowing contacts 18 to close. This is insured since the gate-cathode voltage will be zero for as long as 42 is closed. As a result, the motor is activated through a cycle to change a slide. The slide change mechanism, during the time a slide is changing, has a shutter which moves to cut off the scanning ray beam to the slide and, therefore, blank out the picture on the TV screen.

As the motor starts the change cycle, cam mechanism 48 takes over and holds the contacts 28 open until completion of the slide changing cycle whereupon the cam again allows the contacts to close. Ordinarily prior to completion of the slide changing cycle the operator has released the button which controls switch 42. Therefore, at the end of the cycle the coil or winding 32 is not fully energized, the SCR 26 is turned on and the relay contacts 18 under control of the coil 22 are open, shutting off the motor and returning the system to its quiescent state.

Now, if in the quiescent state the reverse switch 44 is operated, the coil 32 is fully energized, the negative end of the coil being connected to ground directly through the reverse switch. Again the contacts 28 are opened and the coil 22 de-energized to permit closure of relay contacts 18 and setting into operation of motor 15. Now, because the reverse mode is activated when the switch 44 is operated, the carousel will rotate in the opposite direction and the slide changing mechanism will continue to cycle so long as switch 44 is held closed, since as long as switch 44 is closed, contacts 28 are open and coil 22 is de-energized. When the switch 44 is released to its open position, the cycle will continue under control of the aforesaid cam and associated relay contacts 28 until the contacts close, whereupon the coil 22 is again energized and the relay contacts 18 are opened.

The advantages of this circuit should now be obvious. Apart from the complete elimination of stray magnetic fields and vibrations induced by the motor during viewing time, the wear on the motor is greatly reduced by decreasing the amount of time of the motor in duty cycle and the motor does not generate as much heat as when it is in constant motion.

While there has been shown and described what is at present considered the preferred embodiment of the invention, it will be obvious to those skilled in the art that various changes and modifications may be made therein without departing from the scope of the invention as defined by the appended claims.

What is claimed is:

1. A motor control circuit operative to selectively energize a motor, said circuit comprising:
   a source of operating potential adapted to be applied to said motor;
   a first switching means connected in series between said source of operating potential and said motor, said first switching means operative in response to a predetermined signal to selectively apply the source of operating potential to said motor;
   a relay having a control winding and a pair of contacts;
   a source of energizing potential connected to a first end of said control winding;
   a second switching means connected to a second end of said control winding operable to cause current flow through said control winding to cause operation of said pair of contacts; and
   means connecting said pair of contacts in circuit with said first switching means for providing said predetermined signal thereto when said pair of contacts are operated.

2. The invention according to claim 1, wherein said first switching means comprises:
   a second relay having a control winding and a pair of normally closed contacts connected in series between said source of operating potential and said motor;
   means connecting said source of energizing potential to a first end of the control winding of said second relay; and
   means connecting a second end of the control winding of said second relay to said means connecting said second pair of contacts in circuit with said first switching means.

3. The invention according to claim 2 wherein said second switching means comprises:
   a switch, one terminal of which is connected to a first contact of said pair of contacts of said first-named relay and a second terminal of which is connected to the second end of the control winding of said first-named relay, a second contact of said pair of contacts of said first-named relay being connected to the point of reference potential of said source of energizing potential; and
   a cam attached to said motor, said cam operative to hold open the contacts of said first-named relay for one complete cam revolution.

4. The invention according to claim 3 wherein said means connecting a second end of the control winding of said second relay to said means connecting said second pair of contacts in circuit with said first switching means comprises:
   a silicon controlled rectifier having anode, cathode and gate electrodes;
   means connecting the anode electrode of said silicon controlled rectifier to the second end of the control winding of said second relay;
   means connecting the cathode electrode of said silicon controlled rectifier to the first contact of said first-named relay; and
   means connecting the gate electrode of said silicon controlled rectifier to the second end of the control winding of said first-named relay.

5. The invention according to claim 3 additionally comprising a second switch having first and second terminals, said first terminal connected to a point of reference potential and said second terminal connected to the second end of the control winding of said first-named relay.

6. A motor control circuit operative to selectively energize a motor, said circuit comprising:
   first and second relays each having a control winding and a pair of normally closed contacts;
   a source of operating potential adapted to be applied to said motor;
   a source of energizing potential connected to a point of reference potential;
   means connecting the contacts of said first relay in series between said motor and said source of operating potential;
   means connecting first ends of the control windings of said first and second relays to said source of energizing potential;
   a silicon controlled rectifier having anode, cathode and gate electrodes;
   means connecting the anode electrode of said silicon controlled rectifier to the second end of the control winding of said first relay;
   means connecting the cathode electrode of said silicon controlled rectifier to a first contact of said second relay;
   an inductor and a resistor connected in series between the second end of the control winding of said second relay and the gate electrode of said silicon controlled rectifier;
   a second resistor connected between the gate and cathode electrodes of said silicon controlled rectifier;
   means connecting the second contact of said second relay to a point of reference potential;

a switch having a first terminal connected to the first end of the control winding of said second relay and having a second terminal connected to the first contact of said second relay; and a cam attached to said motor, said cam operative to hold open the contacts of said second relay for one complete cam revolution.

7. The invention according to claim 6 additionally comprising a second switch having a first contact connected to the first end of the control winding of said second relay and having a second terminal connected to a point of reference potential.

References Cited

UNITED STATES PATENTS

| | | | |
|---|---|---|---|
| 3,153,176 | 10/1964 | Clay | 317—148.5 |
| 3,157,800 | 11/1964 | Burwell | 317—148.5 |
| 3,349,510 | 10/1967 | Kluge | 318—466 |
| 3,447,031 | 5/1969 | Jenks | 317—148.5 |

BENJAMIN DOBECK, Primary Examiner

U.S. Cl. X.R.

317—148.5; 318—470